US012631159B2

(12) United States Patent
Da Cruz Rodrigues et al.

(10) Patent No.: US 12,631,159 B2
(45) Date of Patent: May 19, 2026

(54) SUBSEA SYSTEM FOR ENERGY CAPTURE ON FLOATING PLATFORMS

(71) Applicant: PETRÓLEO BRASILEIRO S.A.—PETROBRAS, Rio de Janeiro (BR)

(72) Inventors: Marcelo Da Cruz Rodrigues, Rio de Janeiro (BR); Joel Jorge Dias Goncalves, Rio de Janeiro (BR); Daniel Greco Duarte, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 18/966,719

(22) Filed: Dec. 3, 2024

(65) Prior Publication Data

US 2025/0179986 A1 Jun. 5, 2025

(30) Foreign Application Priority Data

Dec. 3, 2023 (BR) .......................... 1020230253725

(51) Int. Cl.
*F03B 13/20* (2006.01)

(52) U.S. Cl.
CPC .................................... *F03B 13/20* (2013.01)

(58) Field of Classification Search
CPC ........................................................ F03B 13/20
See application file for complete search history.

(56) References Cited

U.S. PATENT DOCUMENTS 4,355,511 A * 10/1982 Jones .................. F03B 13/1845 60/507

FOREIGN PATENT DOCUMENTS

BR 112016008995 B1 8/2017

* cited by examiner

*Primary Examiner* — Viet P Nguyen

(74) *Attorney, Agent, or Firm* — Troutman Pepper Locke LLP

(57) ABSTRACT

This application relates to a system for generating energy from the heave motion of risers on floating platforms. In particular, it is noted that the described system comprises a pair of split belts (1.3) where at least one capture and conversion module is fixed, wherein the capture and conversion module comprises: an articulated vane (10) composed of a shovel (1) and a rigid rod (1.1), a motion conversion unit (20), an electric generator (3), a protective housing (5), a metal chassis (1.2) for fixing at least one capture and conversion module; and an electric accumulator module (40) connected to the at least one capture and conversion module, wherein the electric accumulator module comprises: a control unit (60) and one or more electric accumulators (50).

12 Claims, 5 Drawing Sheets

SUBSEA SYSTEM FOR ENERGY CAPTURE ON FLOATING PLATFORMS

CROSS-REFERENCE TO RELATED APPLICATIONS

The present application claims the benefit of Brazilian Patent Application No. BR1020230253725, filed Dec. 3, 2023, the entire contents of which are fully incorporated herein by reference.

FIELD

The present invention falls within the field of technologies applicable to inspection and monitoring of the vicinity of floating platforms, specifically with regard to ways of electrically powering inspection and monitoring systems.

BACKGROUND

In recent years, the oil and gas exploration industry has faced a considerable challenge in the search for efficient inspection and monitoring solutions on floating platforms. The riser region of these platforms is critical, requiring the detection of problems such as broken wire and flooded annulus, among others. For the installation of permanent inspection and monitoring equipment in this area, a reliable and continuous power source becomes essential. In this context, a notable innovation is the present subsea system for capturing energy on floating platforms, a solution that takes advantage of the characteristics of the marine environment to generate energy and meet the energy needs of this equipment on site.

Currently, to power the measuring equipment located in the riser region, the power source generally comes from the platform itself. However, this implies modifications to the surface unit (topside) and, in many cases, requires running cables through the I-Tube area, an area that is difficult to inspect and maintain. Alternatively, some solutions use batteries integrated into the sensors, which in turn results in periodic replacement of these batteries.

Especially in cases where the electrical power comes from the platform, diving may be necessary to integrate the equipment into the circuit that passes through the I-Tube, increasing the risk and associated costs.

The proposed solution for this challenging scenario, as described in the present invention, consists of using the vertical movement of the platform, known as heave, to generate energy. Riser heave refers to the upward and downward vertical movement that risers, which are pipes or ducts that connect a floating platform (such as an oil or gas platform) to the seabed, experience due to waves and the action of ocean currents. Riser heave can actually be caused by the action of waves, ocean currents and other environmental factors. In this sense, the present invention describes a system whose operation involves energy capture units coupled to the risers, which convert the movement of the platform into electricity to power the inspection and monitoring equipment installed near the risers. This approach eliminates the need for modifications to the surface unit (topside) and the eventual demand for diving, in addition to increasing the autonomy of such equipment.

One of the crucial advantages of this innovation is that interventions can be carried out by Remotely Operated Vehicles (ROV), a resource already widely used in the industry for inspection and maintenance tasks. In addition, the installation of the subsea system modules for energy capture can also be performed by ROV, reducing the need for complex and expensive diving operations.

The proposed solution stands out for its efficiency and long-term savings. Generating electricity from the vertical movement of the platform provides a reliable source of energy to power the measuring equipment. In addition, this local generation eliminates the need for costly modifications to the surface unit, as well as periodic battery replacement, considerably reducing operating costs.

This approach aims to meet specific inspection and monitoring applications in the vicinity of floating platforms, providing energy in the order of hundreds of Watts, which is suitable for powering measuring equipment.

In summary, the subsea system for capturing energy on floating platforms represents a significant innovation in the oil and gas industry, addressing current challenges in an effective, economical and environmentally friendly way. By using energy from the subsea environment, this solution offers energy autonomy and reduces the need for complex interventions, becoming an attractive alternative for powering measuring equipment on floating platforms, with long-term benefits in terms of economy and sustainability.

STATE OF THE ART

Currently, in the state of the art, some systems are available for capturing energy on site in maritime regions, however, all of them have significant differences from the proposal of the invention. For example, there is no system in the state of the art that can be installed in pipelines or risers that are already in operation. In addition, the state of the art lacks systems that efficiently serve deep waters, and are also resistant to incrustations.

Below, some available publications of the state of the art of the present invention are shown, together with comparative comments with the technique described and claimed herein.

The document BR 112016008995 B1 describes a method and an apparatus for generating electrical energy. The method includes the steps of rotating turbine blades of at least one turbine, provided in a region of a submarine or umbilical tube through a respective movement of seawater, through a swept area associated with the turbine blades, and generating electrical energy in response to the rotation of the turbine blades.

An analysis of this publication BR 112016008995 B1 allows us to observe that its technology neglects important topics, such as detailing the installation and intervention mechanisms, operating depth (water depth) and hydrostatics.

Furthermore, in relation to the construction aspects, the type of encapsulation of the "[069] additional parts of the turbine" (see FIG. 5 of its publication), treatment of incrustations (organic or inorganic, depending on the depth), fluid dynamic analysis of the turbine, etc. are not even mentioned. It should also be noted that BR 112016008995 B1 can hardly be inserted into already installed ducts or risers, since elements such as "[067] blade supports, bearings and internal gear" appear to be one piece and embrace the duct circumferentially, which indicates that in order to install the turbine, the duct must pass through the inside of the turbine, just as a ring or wedding ring fits on a finger, for example. This would only be possible on deck (or in the factory) before the duct is launched. The same applies to removing the turbine in the event of a failure: this would hardly be possible with the duct installed. The duct would have to be segmented or the "[067] blade supports, bearings and internal gear" would have to be destroyed.

Furthermore, it should be noted that BR 112016008995 B1 is not suitable for deep waters, since the transmission of movement from the turbine to the generator occurs exclusively via a rotating shaft (see paragraphs and of its publication), which makes it very difficult to ensure watertightness (or mechanical sealing), preventing water from entering the environment where the "[069] additional parts of the turbine" are contained, unless they can operate with compensated internal pressure, which is not mentioned in the document.

It should also be noted that BR 112016008995 B1 is quite sensitive to organic incrustations (which quickly deposit in the pipes in shallow waters), which will grow in the section of the pipe that is inside the "[067] turbine blades", obstructing the passage of water flow and even blocking the rotation of the blades.

Finally, it is perfectly noteworthy that BR 112016008995 B1 has low energy capture efficiency, since the duct passes inside the blades, obstructing a large part of the water flow, in addition to there being no openings/slits between the blades, in the blade support, to drain the water deflected (upwards or downwards, depending on the direction of rotation) by the blades. This may imply prohibitive dimensions to meet the demand for underwater loads.

Compared to BR 112016008995 B1, the present invention provides a more robust and more specific technology for installation and operation in an underwater environment. Its topology is modular, composed of up to four power generation modules, and can be easily adapted to different loads. Its insertion and removal can be done in already installed ducts, since the tool support is composed of a split ring, installed by an ROV, where the generation modules are attached by quick coupling.

Furthermore, the present invention is resistant to scaling, since materials that delay such phenomenon are chosen. As for scaling that occurs in the pipeline, unlike BR 112016008995 B1, such scaling does not affect the movement of the articulated vanes used in the present invention.

The present invention can also be easily installed in deep waters, when using a hydraulic transmission system, where the vanes move a piston that pressurizes the hydraulic fluid inside a cylinder, or a linear generator can be used (instead of the synchronous generator), thus reducing the number of moving parts and increasing the reliability of the invention.

Finally, the present invention shows greater efficiency in energy capture than the state of the art, since it has better interaction with the mass of moving water, since nothing restricts the drag that the water flow causes on the articulated vane used in the described system, the coupling being direct and the stronger the larger the contact area of the vane.

In this sense, the present invention goes far beyond what is available in the state of the art, especially:

- by using alternative (or linear) movement to extract energy, while the state of the art uses rotary means for this function;
- by extracting energy from the riser heave, that is, from the water flow parallel to the duct, while the state of the art proposes extracting energy from water currents, that is, from the flow perpendicular to the duct;
- by presenting a constructive form capable of being installed in a vast plurality of regions, while the state of the art does not allow for this flexibility of installation environment.

SUMMARY

The present invention describes a system for generating energy that takes advantage of the heave motion (vertical upward and downward movement) of risers on floating platforms. This system consists of a set of split belts that contain capture and conversion modules fixed to them and an electric storage module. Each capture and conversion module is composed of an articulated vane structure, a movement conversion unit, an electric generator, a protective housing and a metal chassis.

The electric storage module is unique in the system. All capture and conversion modules are connected to the same electric storage module, which coordinates them.

The articulated vane interacts with the movement of the sea, converting this movement into a mechanical movement that is then transferred to the motion conversion unit. This unit converts the mechanical movement into rotational energy, driving the electric generator to produce electricity.

The electrical energy generated is stored in electrical accumulators, such as lithium batteries or supercapacitors, and controlled by a control unit. This control unit regulates the storage and supply of energy to consumers based on demand, the charge level of the accumulators and the available energy generated by the movement of the articulated blades.

DETAILED DESCRIPTION OF THE DRAWINGS

The present invention proposes a system for generating energy from the heave motion of risers on floating platforms. Riser heave refers to the upward and downward vertical movement that risers, which are pipes or ducts that connect a floating platform (such as an oil or gas platform) to the seabed, experience due to waves and the action of ocean currents. Riser heave can be caused by the action of waves, ocean currents and other environmental factors. This movement is an important consideration in the design and operation of subsea systems, as it affects the integrity and efficiency of the risers. Therefore, the heave of the risers must be carefully taken into consideration when developing solutions for energy capture or any other application in the riser region of floating platforms.

Figure 1:
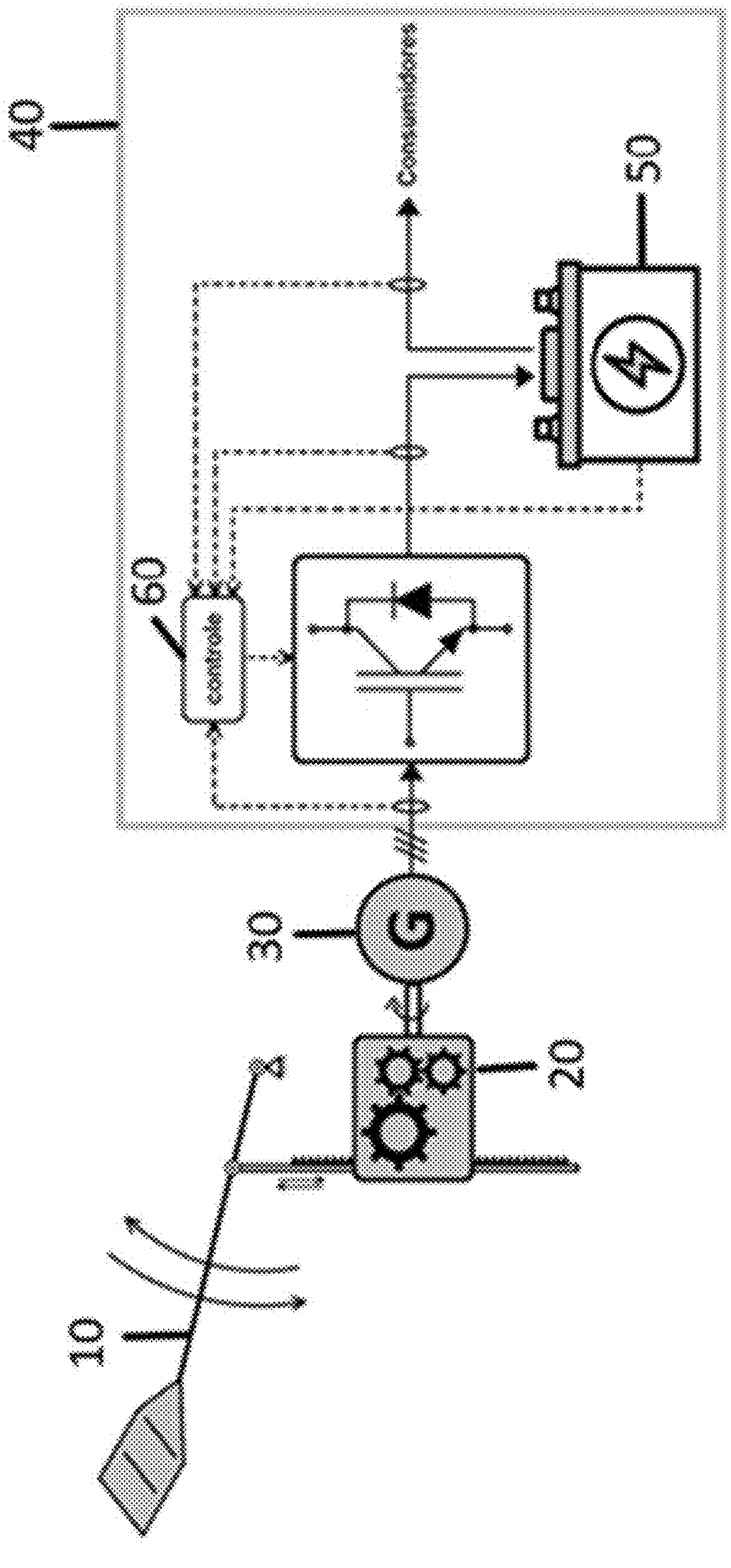
FIG. 1 shows an electromechanical diagram of the energy capture system of the present invention.

FIG. 1 shows an electromechanical diagram of the energy capture system described in the present invention. In particular, it can be seen that the system comprises at least one articulated vane (10) positioned and connectable to a motion conversion unit (20) with which an electric generator (30) communicates. From the output of the electric generator (30) an electric storage module (40) is connected, which coordinates the storage of electric energy in electric storage devices (50) and its supply to consumer devices in the vicinity of the risers by means of a control unit (60).

Figure 2A:
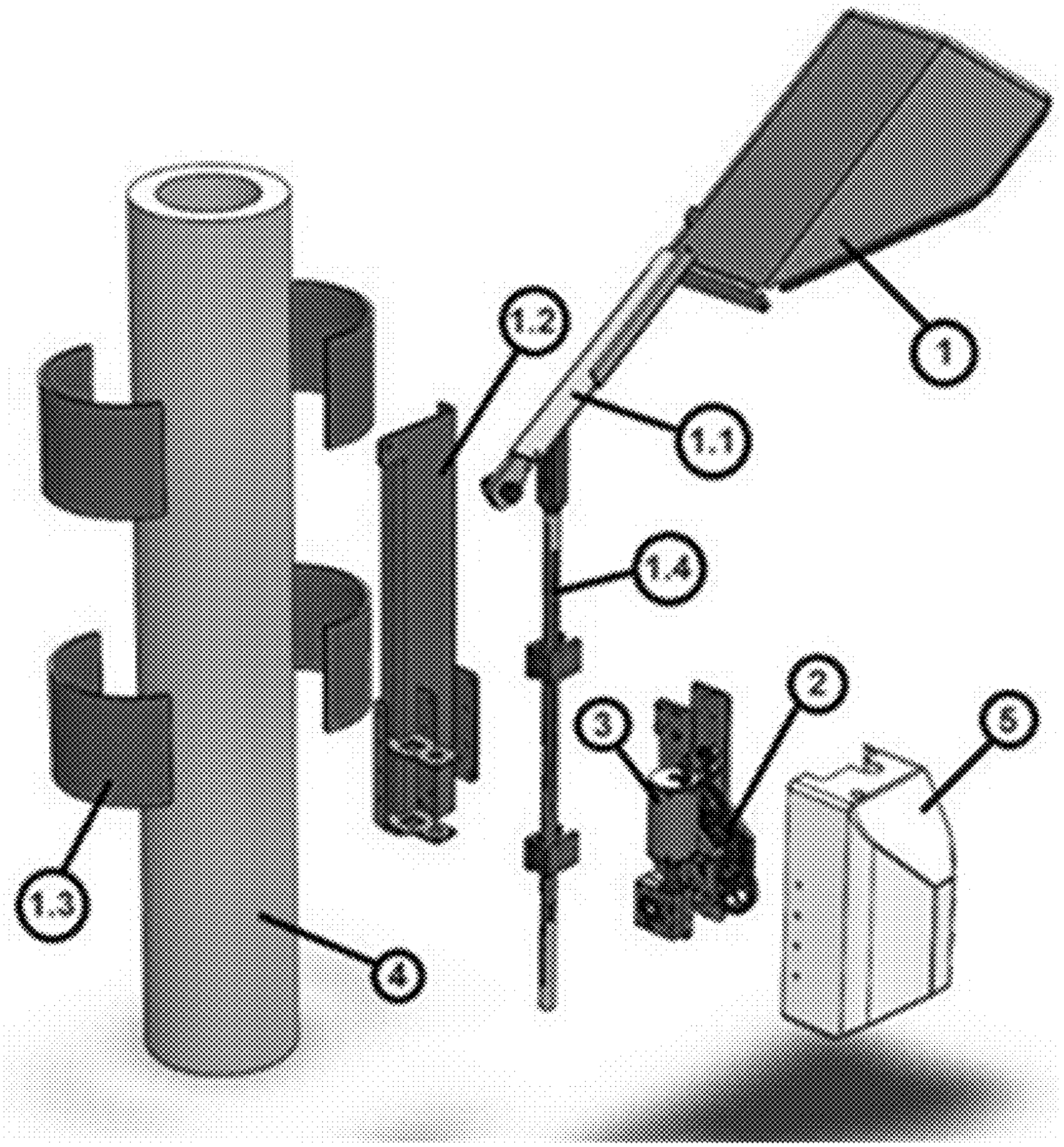
FIG. 2A shows an exploded view of the capture and conversion module of the energy capture system of the present invention.
Figure 2B:
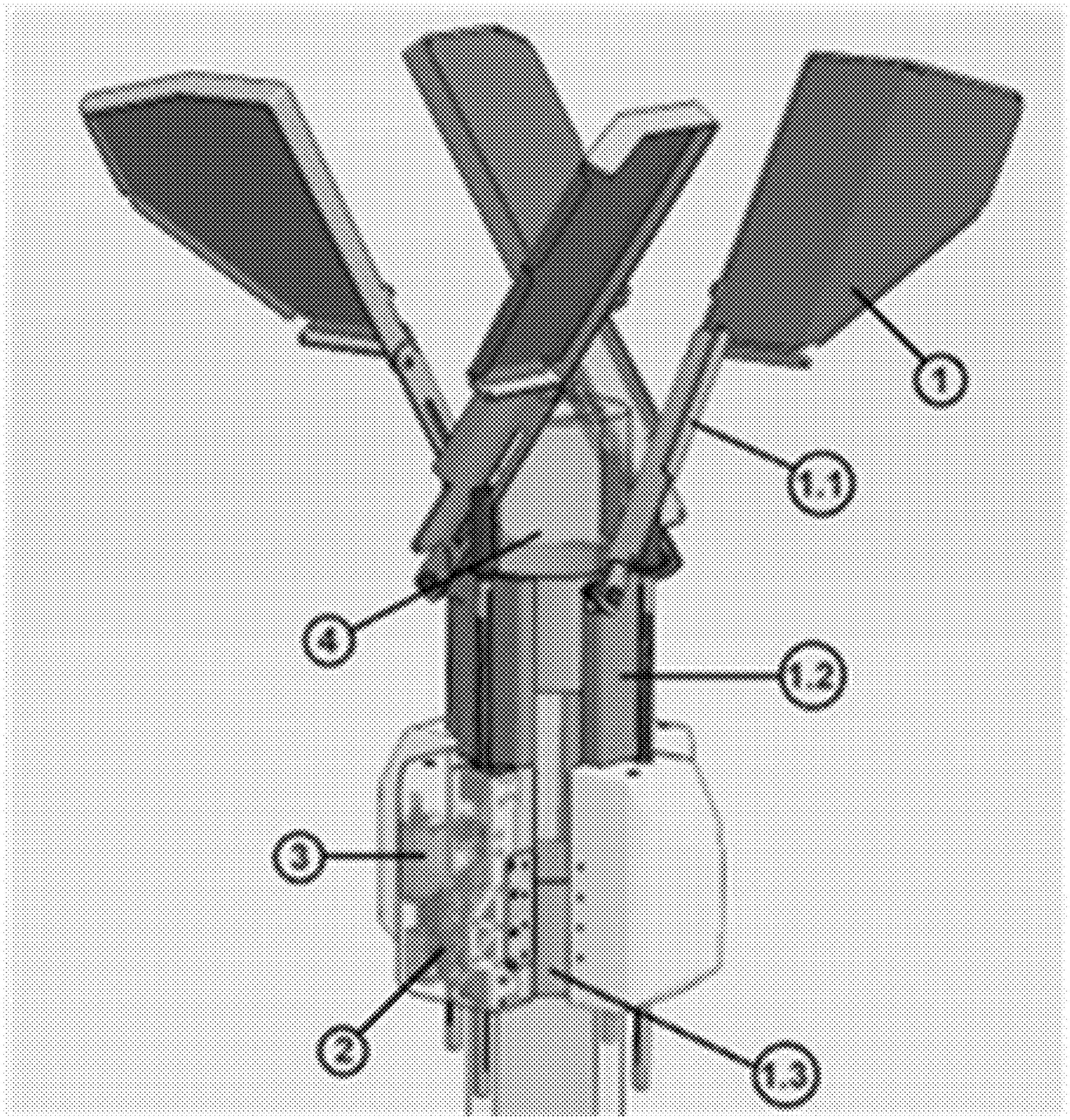
FIG. 2B illustrates an embodiment of the system of the present invention where four capture and conversion modules are used.

FIGS. 2A and 2B are a representation of the energy capture system described in the present invention. FIG. 2A shows an exploded view of the capture and conversion module, where it is possible to observe that the module comprises a pair of split belts (1.3) that surround the riser (4), where the capture and conversion module is fixed. The capture and conversion module comprises an articulated vane composed of a shovel (1) and a rigid rod (1.1), a motion conversion unit including a rack (1.4) and a gearbox (2), an electric generator (3), a protective housing (5), a metal chassis (1.2) for fixing the capture and conversion module.

In its turn, FIG. 2B illustrates an embodiment of the present invention where four capture and conversion modules are fixed to the same pair of split belts (1.3). In this configuration, the articulated vanes (1) are distributed with a certain spacing around the external periphery of the riser (4).

In the capture and conversion modules, the articulated vanes (10) have a physical structure similar to an oar, the shovel (1), with a large contact surface that interacts with the seawater as the floating platform heave motion occurs as a result of the action of the waves.

This movement causes drag on the articulated vane due to its large contact surface. Meanwhile, the rigid rod (1.1) is screwed with freedom of rotation to a fastening device in the metal chassis (1.2), which in its turn is fixed to the metal belts (1.3) by means of a quick-coupling mechanism. The chassis is fixed to both belts to ensure good anchoring of the system in the riser.

In FIGS. 2A and 2B, the capture and conversion modules have a rack (1.4) coupled to the articulated vane that accesses the motion conversion unit. It should be noted that the movement of the articulated vane implies the vertical displacement of the rack (1.4), which accesses and mobilizes the gearbox (2).

In view of the definitions shown above, it can be understood that the system of the invention is fixed to a riser. Thus, there is no relative movement between them, except for the articulated blade (10) that interacts with the seawater as the floating platform heaves upward and downward. This heave motion causes drag on the articulated blade (10) due to its large contact surface.

The energy extracted from the flow during the movement of the articulated blade (10) is converted into rotation to actuate the electric generator (3) by the motion conversion unit (20), this motion conversion unit (20) being made up of a set of gears or a hydraulic system.

In this sense, as an option to the use of a hydraulic system in the motion conversion unit (20) at great depths, said motion conversion unit (20) can be configured by gears, being the preferred modality for use at shallower depths. The articulated vane (10), in this embodiment, is interconnected to a rack (1.4) which, meshed with a pinion, converts the reciprocating movement into rotary motion, in which the rotation is adjusted to the nominal value of the electric generator (3) by a suitable gear ratio. A double ratchet and floating gear assembly, in an exemplary embodiment, can be used to enable the use of both upward and downward movements of the articulated vane (10), driving the electric generator (3) in the same direction.

The electric storage module (40) is composed of lithium batteries or supercapacitors (electric storage modules (50)), with the capacity to store energy. To control the charging regime of the electric storage module (40) and the supply of energy to the consumer(s), the use of a control unit (60) is programmed, which is composed of measurement and control subsystems and a static converter (power electronics). The static converter extracts power from the electric generator (30) and transfers it to the electric accumulators (50). This conversion rate is estimated by a controller that, based on the amount of energy available in the movement of the articulated vane (10), the charge level of the electric accumulators (50) and the demand of the consumer(s), calculates the optimal setpoint for the converter.

In this way, the load unit (40) coordinates the operation of the entire electric accumulator module with the sole purpose of instantly delivering the energy demanded by the consumer(s). The system components are sized to meet the needs of consumers within a certain operating regime. This energy must be supplied by the electric accumulators, which are continuously recharged by the control unit (60) by extracting energy from the heave motion of the articulated vanes (10).

In this preferred embodiment of the invention, the pair of motion conversion unit (20) plus electric generator (30) is dimensioned in modules of up to 25 W, and there may be up to four modules in parallel per system. In this sense, the electric accumulator (50) will be dimensioned to supply up to 1200 Wh at 24 Volts.

The solution described by the present invention therefore comprises a system that can be applied to the risers of floating platforms to supply power to tools installed nearby for inspection and/or monitoring. For example, the system proposed herein is capable of being a power source for inspection and/or monitoring in the region of the risers of floating platforms, such as detecting broken wire, flooded annulus, etc. The invention may be integrated into the measurement tool or be installed separately by remotely operated vehicles (ROV). Its concept is modular, allowing it to cover a wide power range and can be replicated in several sets along the riser. The technology can be applied in shallow waters (up to 50 m) or deep waters (up to 3000 m) by adapting the use of hydraulic means or gears described above, designed in the generating units to reduce the riser movement with depth. These changes include, precisely, the use of articulated vanes (10) with a larger area and a motion conversion unit (20) providing hydraulic cylinders with a larger diameter or a different gear ratio to maintain the rotation generated due to the smaller amplitude of the expected heave motion. At greater depths, preference is given to hydraulic motion conversion units (20) because they simplify the seals to be used in the coupling with the electric generator (30). The motion conversion unit (20) by gears is preferably used at shallower depths (up to 50 m). The motion conversion unit comprises a piston connected to the articulated vane (10), which accesses a hydraulic cylinder pressurizing a fluid that moves a mini hydraulic turbine (or hydraulic motor) a gearbox (2) and that converts the linear motion of the piston into rotary motion, actuating the electric generator (3).

Figure 3:
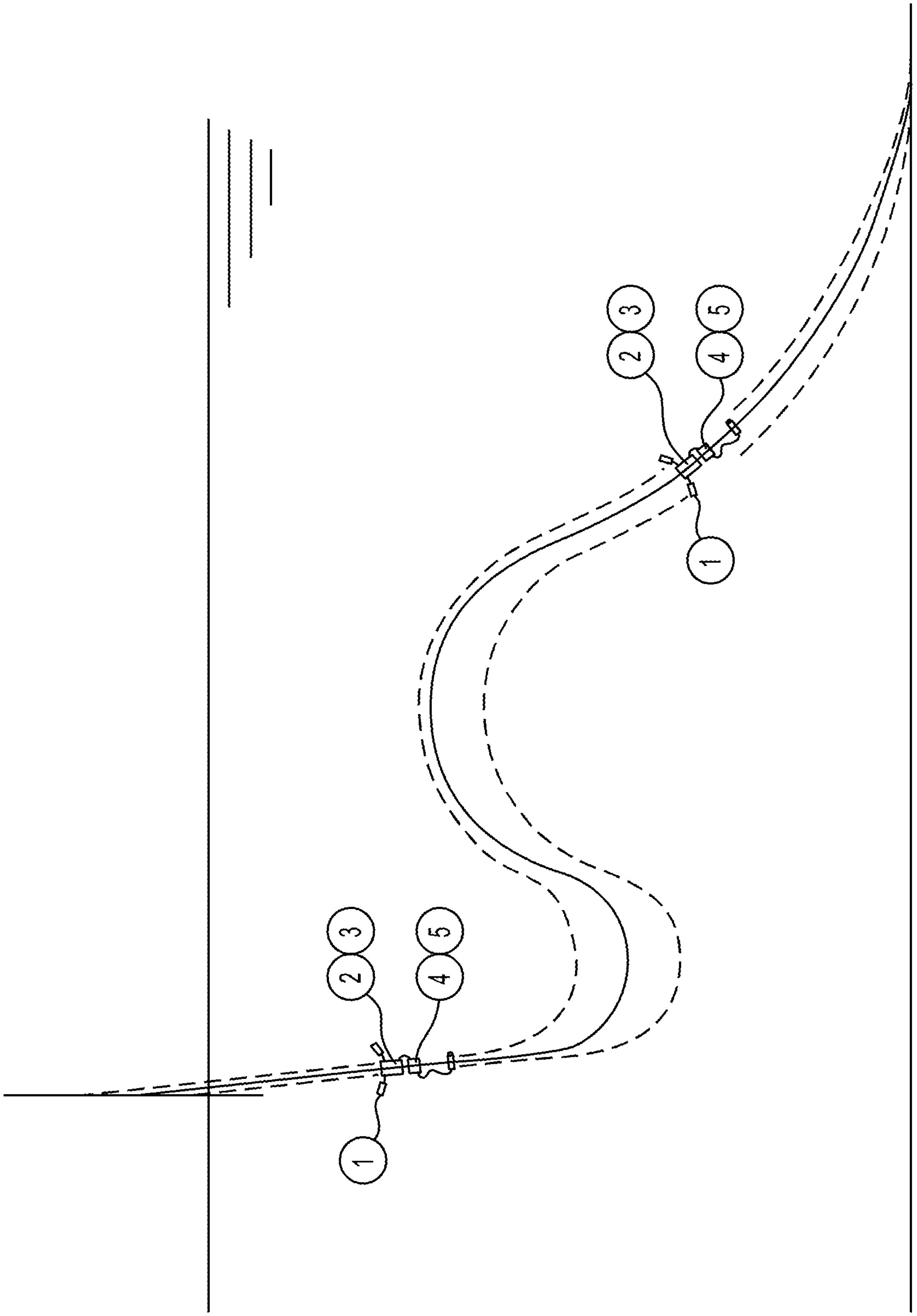
FIG. 3 shows a graphical representation of the system of the present invention, which aims to illustrate its positioning in the shallow part and in the deep part of the riser in lazy wave mode. The lower and upper limits of the riser travel are shown when it moves due to the heave of the vessel.

FIG. 3 is a graphic representation of an exemplary embodiment of the use of the system of the present invention, which aims to illustrate its positioning in the shallow part and in the deep part of a riser in lazy wave mode. The term "lazy wave riser" refers to a type of riser used in subsea installations for oil and gas exploration, especially in deep waters. Lazy wave risers are designed to accommodate the movements of floating platforms due to waves and ocean currents, allowing the riser to move in order to accommodate these movements. In a lazy wave riser configuration, the riser is not vertical, as in a conventional configuration, but has a wavy or zigzag shape. This is done to reduce stress on the riser when the floating platform moves up and down due to wave action. The riser is designed in such a way that its wavy shape follows the movements of the platform, maintaining the structural integrity of the riser and allowing fluids, such as oil and gas, to flow between the platform and the seabed effectively. The lazy wave configuration is an approach that aims to minimize stress and tension on the riser, providing greater flexibility and safety in deepwater oil and gas exploration operations. This is particularly important in challenging environments where sea conditions can be adverse and floating platforms are subject to significant movements. The lower and upper limits of the riser travel when it is displaced by the heave of the vessel are shown.

Figure 4:
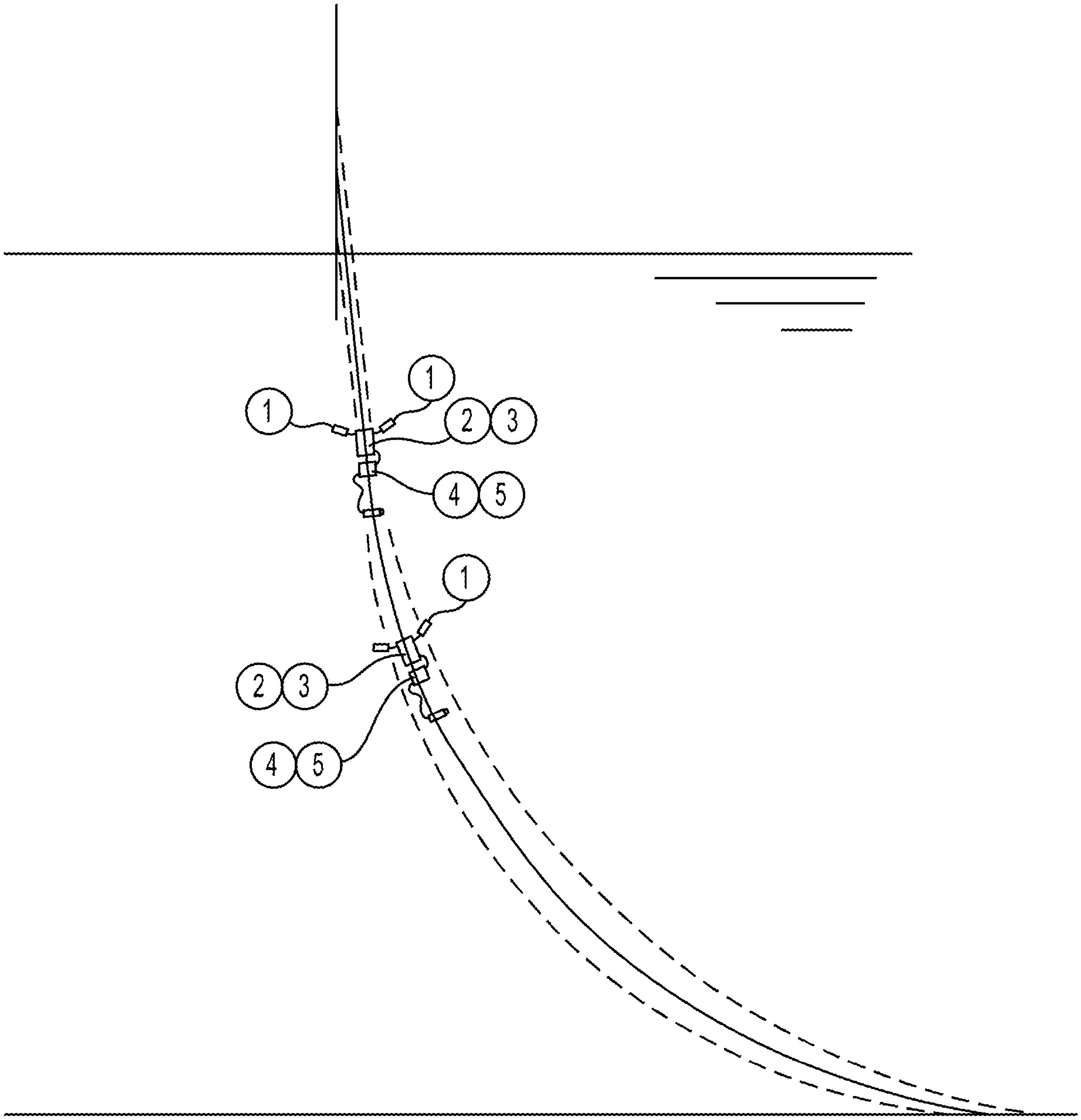
FIG. 4 is a graphical representation of the system of the present invention, which aims to illustrate the positioning of the riser system in free catenary. The lower and upper limits of the riser travel are shown when it is displaced due to the heave of the vessel.

FIG. 4 is a graphical representation of an exemplary embodiment of the use of the system of the present invention, which aims to illustrate the positioning of the free catenary riser system. The term "free catenary riser" refers to a type of riser that connects a floating platform or a ship to an underwater installation, such as an oil or gas well on the seabed, in which its main characteristic is to be designed to behave like a catenary, which is a U-shaped mathematical curve that occurs when a cable or pipeline is suspended between two fixed points and subjected to the action of gravity and other forces. In the context of free catenary risers, the pipeline is designed to be suspended between the floating platform and the seabed, forming a natural catenary-shaped curve. This occurs due to the weight of the riser and the tension caused by the movement of the floating platform, ocean currents and waves. The lower and upper limits of the travel of the riser are shown when it moves due to the heave of the vessel.

The present invention is described herein in terms of its preferred embodiment. A person skilled in the art in possession of the information described herein is perfectly capable of observing that changes can be made based on the present description, such changes still being included within the described and claimed scope.

The invention claimed is:

1. A system for generating energy from heave motion of rises on floating platforms, comprising:
- a pair of split belts where at least one capture and conversion module is fixed, wherein the capture and conversion module comprises:
  - an articulated vane comprising a shovel and a rigid rod,
  - a motion conversion unit,
  - an electric generator,
  - a protective housing,
  - a metal chassis for fixing the at least one capture and conversion module; and
  - an electric accumulator module connected to the at least one capture and conversion module, wherein the electric accumulator module comprises a control unit and one or more electric accumulators.

2. The system according to claim 1, wherein the capture and conversion module is fixed to the pair of split belts by means of a quick-coupling mechanism with its metal chassis.

3. The system according to claim 1, wherein:
- the shovel of the articulated vane has a paddle shape,
- the shovel interacts with the seawater due to the heave motion, and
- the rigid rod of the vane is screwed with freedom of rotation to the metal chassis.

4. The system according to claim 3, wherein the articulated vane is connected to the motion conversion unit configured to articulate due to the motion of the articulated vane.

5. The system according to claim 4, wherein the motion conversion unit comprises a rack connected to the articulated vane, the rack is configured to access a gearbox and convert reciprocating motion into rotary motion by a pinion, actuating the electric generator.

6. The system according to claim 5, wherein the rotary motion is adjusted to a nominal value of the electric generator by the gearbox, by a double ratchet and floating gear assembly, actuating the electric generator in the same direction of rotation.

7. The system according to claim 4, wherein the motion conversion unit comprises a piston connected to the articulated vane, which is configured to access a hydraulic cylinder pressurizing a fluid configured to move a mini hydraulic turbine or hydraulic motor and converts the linear motion of the piston into rotary motion, actuating the electric generator.

8. The system according to claim 1, wherein the electric accumulator module comprises lithium batteries or supercapacitors with the capacity to store energy, and wherein the control of the storage regime of the electric accumulators and the supply of energy to consumers is programmed by the control unit.

9. The system according to claim 8, wherein the control unit comprises measuring and control mechanisms and a static converter, and
- wherein the static converter is configured to extract power from the electric generator and transfer it to the electric accumulators with a conversion rate estimated by a controller based on the amount of energy made available by the motion of the articulated vane, the charge level of the electric accumulators, and the demand of consumers.

10. The system according to claim 1, wherein the pair of split belts are configured to receive up to four capture and conversion modules.

11. The system according to claim 10, wherein the capture and conversion modules and the electric accumulator module are connected by electrical flying leads through wet-mate connectors.

12. The system according to claim 1, wherein the electric accumulator module is configured to be powered by up to four capture and conversion modules.

* * * * *